(12) United States Patent
Ramachandran et al.

(10) Patent No.: US 6,743,400 B2
(45) Date of Patent: Jun. 1, 2004

(54) SPARGER CONFIGURATION FOR FLUIDIZED BED HYDROCARBON PARTIAL OXIDATION REACTORS

(75) Inventors: Ramakrishnan Ramachandran, Allendale, NJ (US); Prabhu Balaraman, Scotch Plains, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 602 days.

(21) Appl. No.: 09/813,508

(22) Filed: Mar. 21, 2001

(65) Prior Publication Data

US 2002/0182123 A1 Dec. 5, 2002

(51) Int. Cl.[7] .............................................. B32B 19/02
(52) U.S. Cl. ........................................ 422/137; 422/139
(58) Field of Search ................................ 422/137, 139, 422/144, 147

(56) References Cited

U.S. PATENT DOCUMENTS

| | | | | |
|---|---|---|---|---|
| 3,372,734 A | * | 3/1968 | Grubb et al. | 165/104.18 |
| 3,974,091 A | * | 8/1976 | Parker et al. | 502/41 |
| 4,337,143 A | * | 6/1982 | Hanson et al. | 208/410 |
| 4,754,094 A | * | 6/1988 | Jubin, Jr. | 585/500 |
| 4,987,239 A | | 1/1991 | Ramachandran et al. | |
| 5,021,222 A | * | 6/1991 | Owen | 422/144 |
| 5,466,857 A | * | 11/1995 | Reiling et al. | 558/319 |
| 5,973,186 A | | 10/1999 | Midorikawa et al. | |
| 6,110,440 A | | 8/2000 | Ohta et al. | |
| 6,156,921 A | | 12/2000 | Wagner et al. | |

FOREIGN PATENT DOCUMENTS

| | | |
|---|---|---|
| EP | 0 878 464 A1 | 11/1998 |
| EP | 0 885 871 A1 | 12/1998 |

* cited by examiner

*Primary Examiner*—M. Alexandra Elve
(74) *Attorney, Agent, or Firm*—Philip H. Von Neida

(57) ABSTRACT

The present invention is directed to a sparger system provided for appropriately feeding reactant streams to fluidized bed reactors of hydrocarbon partial oxidation processes that are retrofitted to selectively recover and recycle unreacted hydrocarbons. As a result of the sparger system, the reactor productivity and selectivity is enhanced while employing only two spargers. Also, the capital cost required for retrofitting existing sparging equipment is minimized, while at the same time, the desired fluidization and catalyst oxidation characteristics are achieved without the formation of flammable mixtures within the sparging system.

16 Claims, 3 Drawing Sheets

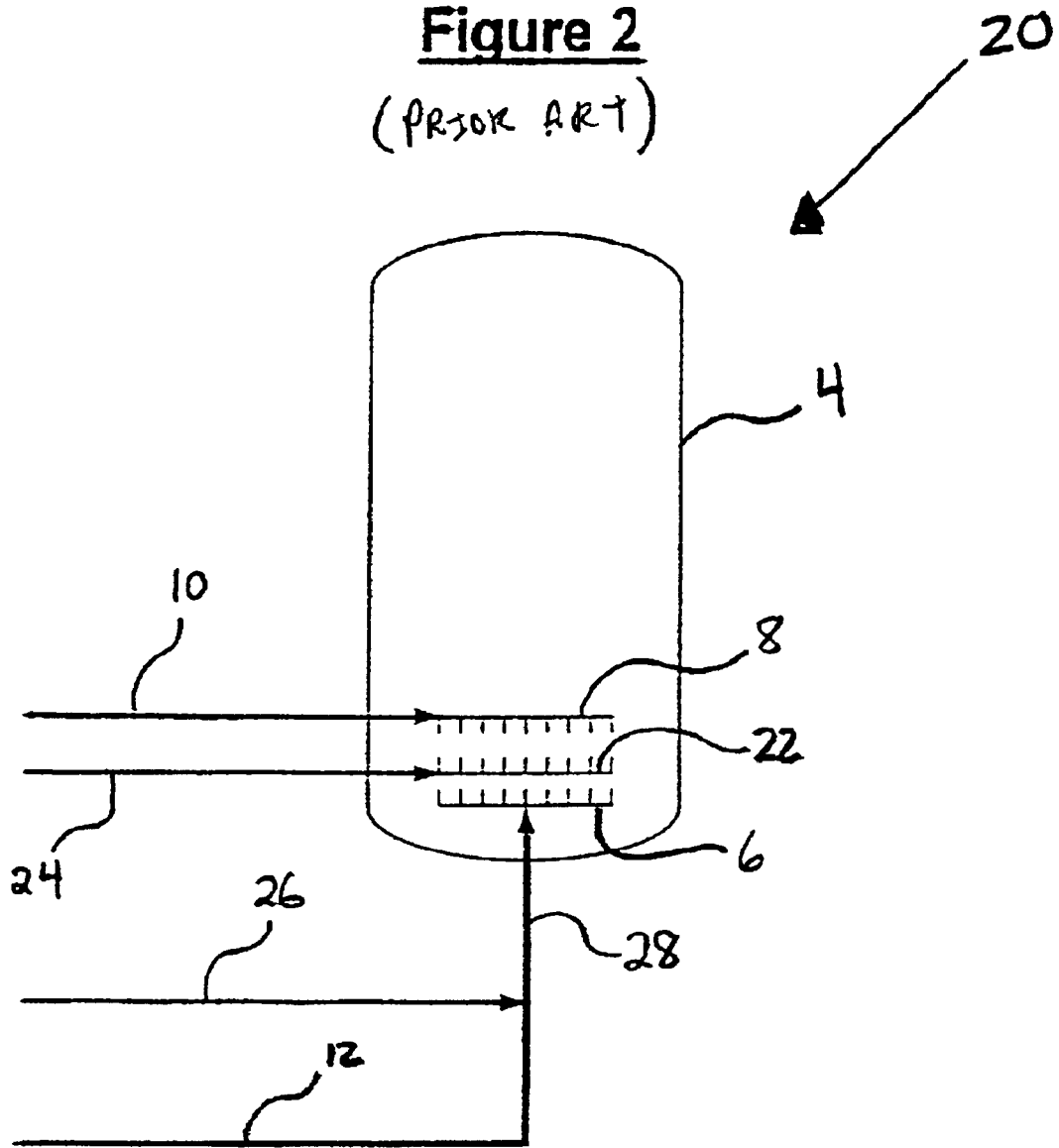

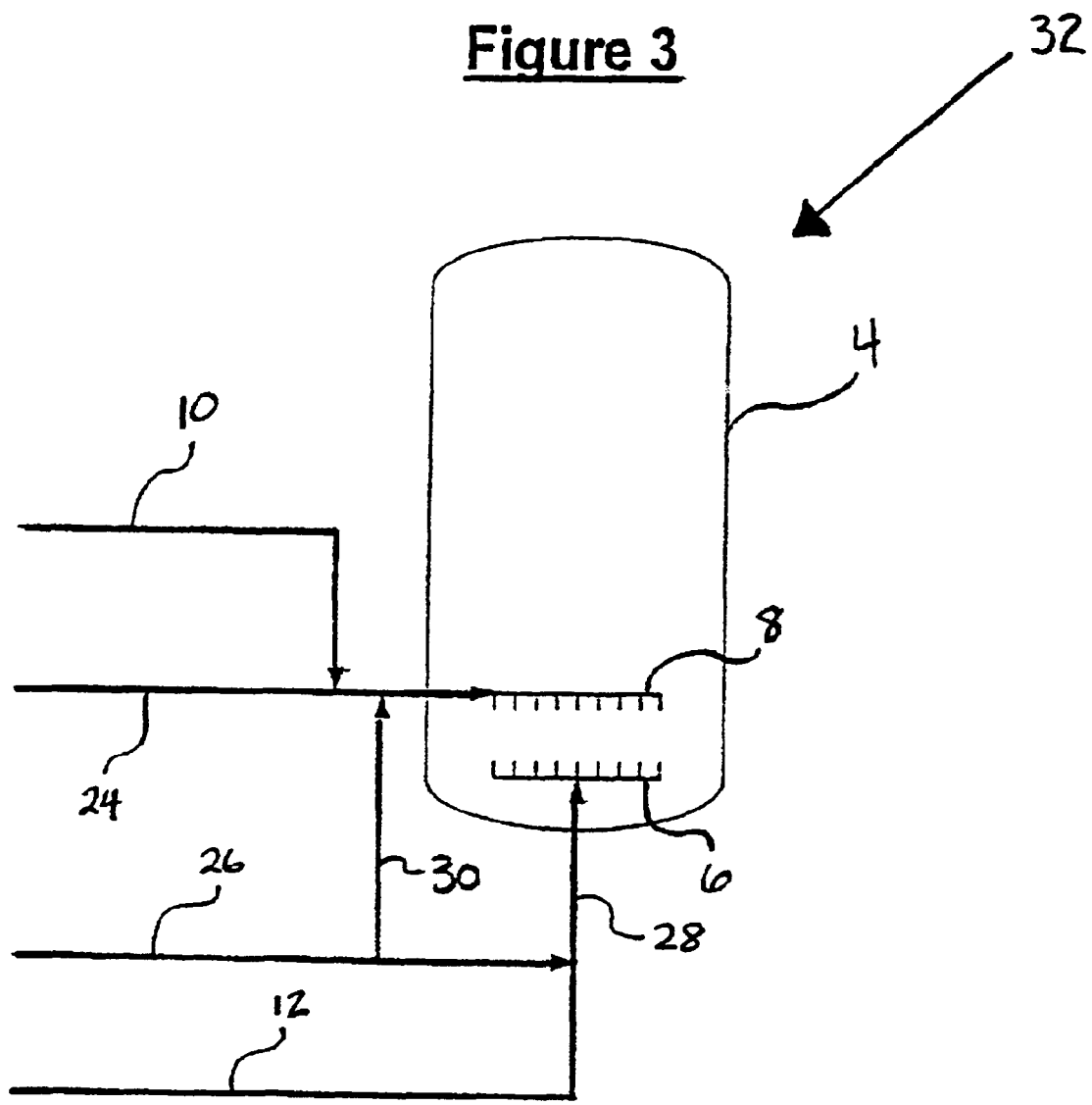

SPARGER CONFIGURATION FOR FLUIDIZED BED HYDROCARBON PARTIAL OXIDATION REACTORS

BACKGROUND OF THE INVENTION

1. Field of the Invention

This invention relates to a sparger system provided for appropriately feeding reactant streams to fluidized bed reactors of hydrocarbon partial oxidation processes that are retrofitted to selectively recover and recycle unreacted hydrocarbons. This novel sparger system minimizes the capital cost required for retrofitting the existing sparging equipment, while at the same time allows the desired fluidization and catalyst oxidation characteristics to be achieved without the formation of flammable mixtures anywhere inside the sparging system.

2. Description of Art

Partial oxidation products, such as, maleic anhydride and acrylonitrile, are typically produced by the oxidation of hydrocarbons, such as, butane, butylene, propylene, or propane, using atmospheric air in fluidized bed reactors. These processes typically operate at high hydrocarbon conversions (of the order to 75 to 99%) in order to maximize the once-through product yield. The unreacted hydrocarbons contained in the reactor effluent are incinerated after the product is recovered in a product recovery unit.

Recently, recycle-based processes with higher productivity and selectivity have been proposed, wherein the reactor is operated at significantly lower reactant conversion to enhance the selectivity to the desired product and the unreacted hydrocarbons are recovered in a selective recovery unit and recycled back to the reactor. In a typical recycle process, the unreacted hydrocarbons are selectively recovered in a pressure swing adsorption (PSA) unit. During the adsorption step of the separation process, the hydrocarbons are adsorbed on a selective adsorbent, while the undesired components of the effluent stream are rejected into the waste stream from the PSA unit. During the regeneration step of the PSA unit, the hydrocarbons are desorbed and recovered in the recycle stream by lowering the pressure and simultaneously purging with a controlled amount of regeneration gas, such as, air. The desorption pressure and regeneration gas flow rate are adjusted to prevent the formation of flammable mixtures in the recycle stream. Additionally, these operating parameters can be adjusted to achieve the desired linear velocities in the reactor sparging equipment used to inject the feed streams to the reactor.

The recycle-based processes can be applied as modifications to existing non-recycle processes, as well as to new grassroots plants. Higher reactor inlet concentrations of hydrocarbon and oxygen are employed to enhance the reactor productivity. The increase in the reactant concentrations is achieved by using oxygen-enriched air or by substituting a portion of the air with oxygen. For a retrofit application, the recycle of recovered hydrocarbons and the use of enriched air or oxygen requires modification to the existing reactor sparging equipment. Additionally, the presence of enriched air or oxygen requires costly upgrades to the materials of construction, and hence in the overall capital cost. In addition to the above, some catalysts may be more sensitive to high oxygen concentrations.

Referring to the figures, and FIG. 1 in particular, a typical fluidized bed reactor for a non-recycle process is represented generally by numeral 2. Typically, the non-recycle reactor has two or more reactant streams and two spargers. The reactant air 12 is typically sparged from the bottom sparger 6 and the vaporized hydrocarbon feed 10 is introduced through a second sparger 8 located at a certain distance above the bottom sparger 6. The introduction of the reactant streams in this manner allows several desirable characteristics to be achieved. Maintenance of an "oxidation zone" at the bottom of the reactor 4 is achieved, wherein reduced catalyst circulating from the upper (reducing) sections of the reactor 14 is re-oxidized and returned to its oxidized state. By introducing air 12 through the bottom sparger 6, the circulating catalyst first comes in contact with an oxygen-rich stream. The catalyst oxidized in this manner then travels upward and subsequently comes in contact with the hydrocarbon 10 fed through the second sparger 8. By staging the contact with the oxidizing and reducing atmospheres, increased catalyst life and higher selectivities to the desired partial oxidation product can be achieved.

Maintenance of a linear velocity high enough to effect sufficient fluidization of the catalyst particles at the bottom of the reactor 4 is also achieved. The bulk of the total reactant feed to the partial oxidation fluidized bed reactor 4 is comprised of the air feed 12. Thus, introducing the air through the bottom sparger 6 accomplishes the task of maintaining a suitably high fluidizing velocity at the bottom of the reactor 4.

Referring to the figures, and in particular FIG. 2, a typical recycle-based retrofitted process is represented generally by reference numeral 20. With a recycle-based reactor, there are typically two additional reactant streams and thus at least one additional sparger 22 to introduce these streams to the reactor 4. Therefore, the existing sparging equipment must be modified to feed three to four separate streams, which include fresh feed hydrocarbon 10, fresh feed air 12, fresh feed oxygen 26, and recycled hydrocarbon 24, as opposed to the two streams of the once-through, non-recycle process represented in FIG. 1 (fresh feed hydrocarbon 10 and fresh feed air 12). A typical recycle-based retrofitted process employs three separate spargers; one sparger 8 for fresh feed hydrocarbon 10, a second sparger 22 for recycled hydrocarbon 24 and a third sparger 6 for the combined air and oxygen stream 28. The combined air and oxygen stream 28 is introduced through a sparger 6 at the bottom of the reactor 4, while the fresh feed hydrocarbon and the recycled hydrocarbon streams are separately introduced through spargers 8, 22 located above bottom sparger 6. Introducing the streams in this manner avoids the formation of flammable mixtures and maintains the oxidation and fluidization characteristics in reactor 4.

However, there are several disadvantages associated with the existing recycle-based retrofitted processes. First, at least one additional sparger is required compared to the once-through, non-recycle process. Secondly, because of the introduction of pure oxygen, the bottom sparger may have to be constructed from a material that is more expensive than the carbon steel that is typically used in commercial plants. Lastly, the introduction of pure oxygen directly into the reactor can potentially have a negative impact on the life of the catalyst. These disadvantages ultimately result in higher capital costs to retrofit the reactor, as additional spargers are necessary, expensive materials of construction are required to handle the introduction of oxygen, and increased catalyst usage and decreased catalyst life.

SUMMARY OF THE INVENTION

The present invention is directed to a sparger system provided for appropriately feeding reactant streams to fluidized bed reactors of hydrocarbon partial oxidation processes that are retrofitted to selectively recover and recycle unreacted hydrocarbons. As a result of the sparger system, the reactor productivity and selectivity is enhanced while employing only two spargers. Also, the capital cost required for retrofitting existing sparging equipment is minimized, while at the same time, the desired fluidization and catalyst oxidation characteristics are achieved without the formation of flammable mixtures within the sparging systems.

The sparger system for use in the recycle-based reactor has a first sparger located in the bottom portion of the reactor for feeding a mixture of oxygen and air to the reactor. A second sparger, located above the first sparger, feeds a mixture of oxygen, recycled hydrocarbon, and fresh feed hydrocarbon to the reactor. The distribution of oxygen through these two spargers is controlled so as to allow the use of a low-cost material for the bottom sparger while maintaining the mixture fed through the second sparger outside the flammability limits and not exposing the catalyst to high oxygen concentrations.

BRIEF DESCRIPTION OF THE DRAWINGS

FIG. 2 shows a typical prior art recycle-based reactor configuration; and

FIG. 3 shows one embodiment of the preferred recycle-based reactor configuration of the present invention.

DETAILED DESCRIPTION OF THE PREFERRED EMBODIMENTS

Figure 1:
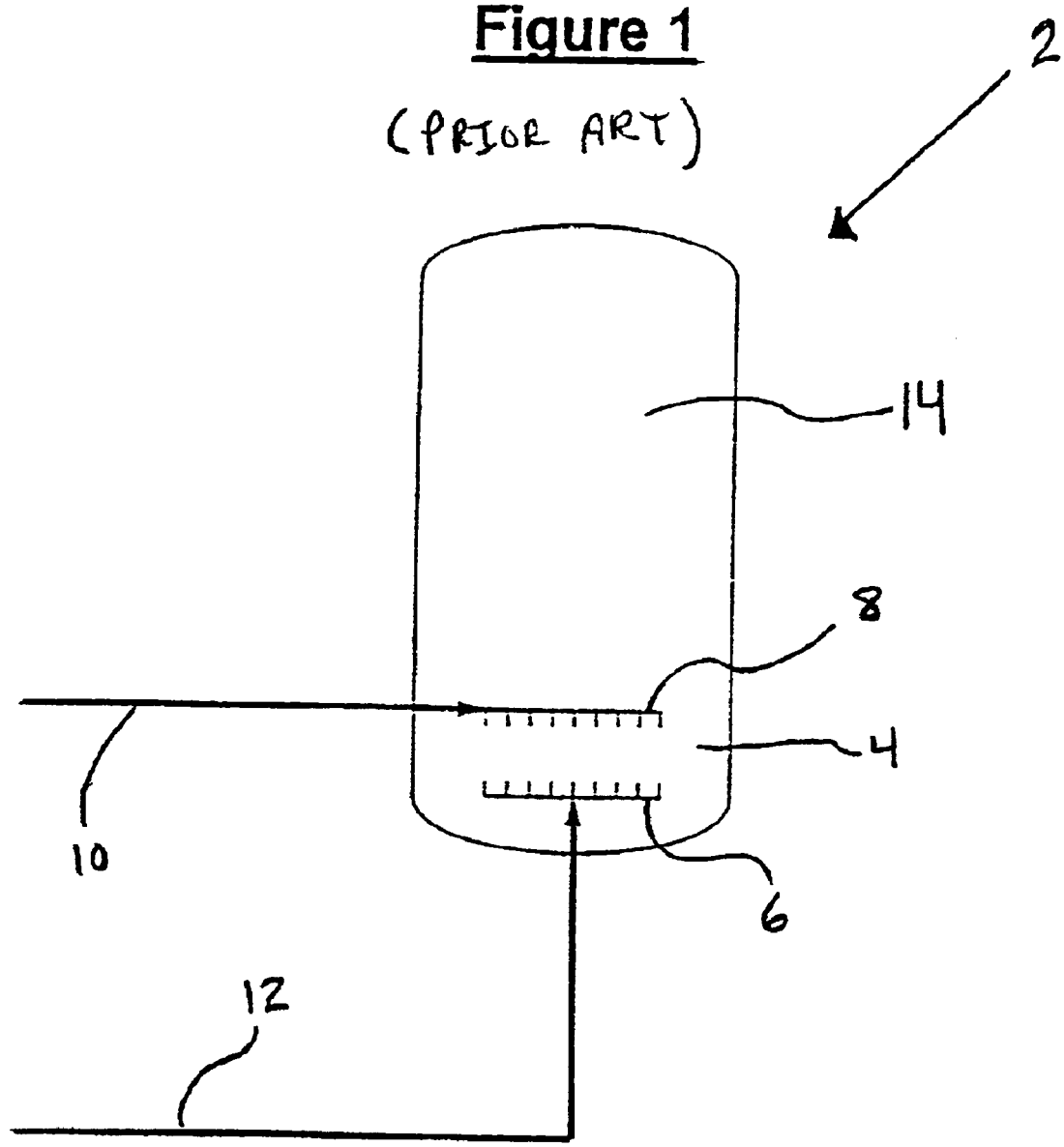
FIG. 1 shows a typical prior art once-through reactor configuration.

Referring to the drawings, and in particular FIG. 3, a preferred embodiment of the present invention is represented generally by reference numeral 32. The recycle-based fluidized-bed reactor is configured such that a portion of the fresh feed oxygen 26 and all of the fresh feed air 12 is injected through a sparger 6 located at the bottom of reactor 4. By maintaining the oxygen concentration in the mixture below a certain critical level, such as, for example, 35 vol %, the existing sparger material, typically low-cost carbon steel, may be used without any modifications. Separately, fresh feed hydrocarbon 10, recycled hydrocarbon 24, and balance of fresh feed oxygen 30 is injected through a second sparger 8 located above bottom sparger 6. Table 1 below summarizes the preferred operating ranges for this embodiment.

TABLE 1

Summary of Operating Ranges

| Parameter | Range | Preferred Range |
|---|---|---|
| Reactor Linear Velocity | 1.5–2.5 ft/sec | |
| Oxygen Enrichment | Such that the fresh feed oxygen supplied constitutes 55–85% of the oxygen supplied via the combined fresh feed oxygen and air streams. Adjusted to keep $O_2$ concentration in Air + $O_2$ stream <35 vol %, and the composition of the hydrocarbon + recycle gas + $O_2$ stream above the UEL. | |
| PSA Regeneration Air Flow Rate | 0–100% of molar feed flow rate to PSA unit | 20–60% of molar feed flow rate to PSA unit Lower regeneration gas flow allows flow through the bottom sparger to be increased. |
| Fraction Fresh Feed $O_2$ Mixed with Fresh Feed Air | 20–90%. Adjusted to keep $O_2$ concentration in Air + $O_2$ stream <35 vol %, and the composition of hydrocarbon + recycle gas + $O_2$ stream above the UEL | |

The flow rates of the individual reactor inlet streams (fresh feed air 12, fresh feed oxygen 26, fresh feed hydrocarbon 10, and recycled hydrocarbon 24) are determined by the overall material balance for the recycle-based process. The overall process material balance is impacted by parameters such as the level of oxygen enrichment, reactor performance and the amount of air used as the regeneration gas used in the PSA unit. In particular, the level of oxygen enrichment and the amount of regeneration gas can be conveniently adjusted to achieve the desired fluidization and catalyst oxidation characteristics without the formation of flammable mixtures in the sparging system.

For the hydrocarbon partial oxidation process of the present invention, the fresh feed oxygen supplied via stream 26 constitutes about 55 to 85% of oxygen supplied via the combined fresh feed oxygen and air streams. The PSA unit can be operated such that the molar flow rate of the regeneration air stream is 0 to 100% of the molar flow rate of the feed to the PSA unit. Preferably, the molar flow rate of the regeneration air stream is 20 to 60% of the molar flow rate of the feed to the PSA unit. Lower regeneration air flow rates allow the flow through bottom sparger 6 to be increased since a correspondingly higher amount of fresh air is required.

For a given material balance, the reactor is preferably sized such that the reactor superficial velocity is between 1.5 to 2.5 ft/sec. For a given overall material balance, the fraction of fresh feed oxygen 26 mixed with the air stream 12 is varied between 20 to 90%. The preferred fraction of oxygen 26 mixed with air stream 12 is the largest fraction that allows the desired fluidization and catalyst characteristics to be achieved without the formation of a flammable mixture inside the sparger system. For cases where these objectives cannot be achieved simultaneously, the level of oxygen enrichment is lowered and a new oxygen split is used, so as to achieve the desired characteristics. Preferably, the mixture of oxygen 26 and air 12 is present in a volume ratio of between about 0.25:1.0 to 1.25:1.0. More preferably, the mixture is present in a volume ratio of between about 0.4:1.0 to 0.65:1.0.

The mixture of fresh feed air 12 and oxygen 26 preferably is fed to sparger 6 of reactor 4 at a flow rate between about 25% and 50% of the total reactor superficial velocity. More preferably, the mixture is fed to sparger 6 at a flow rate between about 30% to 40% of the total reactor superficial velocity. Although the flow rate of fresh feed air 12 and oxygen stream 26 may be lower than the comparable flow rate for a non-recycle case, the linear velocity at the bottom of reactor 4 is sufficient to maintain desirable fluidization characteristics.

The operation of the PSA unit used for recovering the hydrocarbons can also be adjusted to increase the amount of fresh feed air directly injected through bottom sparger 6, while reducing the amount of air introduced through the PSA purge gas. Oxygen-rich stream 28 injected from bottom sparger 6 allows the desired "oxidation zone" to be established at the bottom of reactor 4. Separately, the remaining portion of fresh feed oxygen 30, the entire recycle hydrocarbon 24, and the entire fresh feed hydrocarbon 10 are mixed and fed through a second sparger 8 placed preferably at a distance between about 0.1 feet (ft.) to 10 ft. above bottom sparger 6. The portion of fresh feed oxygen 30 diverted to this stream is controlled to keep the composition of the mixture sufficiently above the upper explosion limit (UEL).

The mixture of oxygen 30, recycle hydrocarbon 24, and fresh feed hydrocarbon 10 is preferably present in a volume ratio between about 1.0:45.0:5.0 to 1.0:2.5:0.5. More preferably, the mixture is present in a volume ratio between about 1.0:8.5:1.0 to 1.0:4.0:0.5. The mixture is preferably fed to sparger 8 at a flow rate between about 50% to 75% of the total reactor superficial velocity. More preferably, the mixture is fed to sparger 8 at a flow rate between about 55% to 70% of the total reactor superficial velocity.

By introducing the feed streams in this manner in the recycle process, only two spargers are required. In addition, the same low-cost materials of construction, such as, carbon steel or low alloy steel, may be used when retrofitting existing non-recycle systems. The desired fluidization and oxidation characteristics of existing non-recycle processes are also maintained using this approach.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A sparger system for use in a recycle-based fluidized bed hydrocarbon partial oxidation reactor which comprises:
   (a) a first sparger for feeding a mixture of oxygen and air to said reactor; and
   (b) a second sparger for feeding a mixture of oxygen, recycled hydrocarbon, and fresh feed hydrocarbon to said reactor.

2. The sparger system of claim 1, wherein said mixture of oxygen and air is present in a volume ratio of between about 0.25:1.0 to 1.25:1.0.

3. The sparger system of claim 2, wherein said mixture is present in a volume ratio of between about 0.4:1.0 to 0.65:1.0.

4. The sparger system of claim 1, wherein said first sparger is located in the bottom portion of said reactor.

5. The sparger system of claim 1, wherein said first sparger is constructed from a material selected from the group consisting of: carbon steel and low-alloy steels.

6. The sparger system of claim 1, wherein said mixture fed by said first sparger is fed to said reactor at a flow rate between about 25% to 50% of the total reactor superficial velocity.

7. The sparger system of claim 6, wherein said mixture is fed to said reactor at a flow rate between about 30% to 40% of the total reactor superficial velocity.

8. The sparger system of claim 1, wherein said mixture of oxygen, recycled hydrocarbon, and fresh feed hydrocarbon is present in a volume ratio of between about 1.0:45.0:5.0 to 1.0:2.5:0.5.

9. The sparger system of claim 8, wherein said mixture is present in a volume ratio between about 1.0:8.5:1.0 to 1.0:4.0:0.5.

10. The sparger system of claim 1, wherein said second sparger is disposed above said first sparger.

11. The sparger system of claim 10, wherein said second sparger is disposed about 0.1 feet to 10 feet above said first sparger.

12. The sparger system of claim 1, wherein said mixture fed by said second sparger is fed to said reactor at a flow rate between about 50% to 75% of the total reactor superficial velocity.

13. The sparger system of claim 12, wherein said mixture fed by said second sparger is fed to said reactor at a flow rate between about 55% to 70% of the total reactor superficial velocity.

14. The sparger system of claim 1, wherein said reactor has a superficial velocity between about 1.5 to 2.5 ft/s.

15. A method for feeding reactant streams to a recycle-based reactor comprising the steps of:
   (a) providing a first sparger disposed in the bottom portion of said reactor;
   (b) feeding a mixture of oxygen and air to said first sparger;
   (c) providing a second sparger above said first sparger; and
   (d) feeding a mixture of oxygen, recycled hydrocarbon, and fresh feed hydrocarbon to said second sparger.

16. A continuous method for the partial oxidation of a hydrocarbon feed comprising the steps of:
   (a) feeding a mixture of oxygen and air to a first sparger disposed in the bottom portion of a reactor;
   (b) feeding a mixture of oxygen and fresh feed hydrocarbon to a second sparger disposed within said reactor above said first sparger; and
   (c) recycling unreacted hydrocarbon from said reactor, whereby said unreacted hydrocarbon is fed back to said reactor via said second sparger.

* * * * *